(12) United States Patent
Corneille et al.

(10) Patent No.: US 6,713,202 B2
(45) Date of Patent: Mar. 30, 2004

(54) MULTIFUEL FUEL CELL SYSTEM AND A METHOD FOR ITS OPERATION

(75) Inventors: Marcel Corneille, Stuttgart (DE); Martina Fischer, Weil der Stadt-Hausen (DE); Berthold Keppeler, Kirtchheim/Teck (DE); Christian Lorenz, Kirchheim/Teck (DE); Stefan Paulik, Laichingen (DE); Bernd Schönrock, Owen/Teck (DE)

(73) Assignee: Ballard Power Systems AG, Kirchheim/Teck-Nabern (DE)

( * ) Notice: Subject to any disclaimer, the term of this patent is extended or adjusted under 35 U.S.C. 154(b) by 239 days.

(21) Appl. No.: 09/796,712

(22) Filed: Mar. 2, 2001

(65) Prior Publication Data

US 2001/0028969 A1 Oct. 11, 2001

(30) Foreign Application Priority Data

Mar. 2, 2000 (DE) .......................................... 100 10 068

(51) Int. Cl.⁷ .......................... H01M 8/04; H01M 8/18; H01M 8/12
(52) U.S. Cl. ............................. 429/17; 429/19; 429/22; 429/24
(58) Field of Search ............................. 429/13, 17, 19, 429/22, 24

(56) References Cited

U.S. PATENT DOCUMENTS 4,473,622 A * 9/1984 Chludzinski et al. ......... 429/19
4,657,826 A * 4/1987 Tajima ......................... 429/12
6,083,637 A * 7/2000 Walz et al. .................... 429/17

FOREIGN PATENT DOCUMENTS

EP           924 161 A2      6/1999
WO           WO 99/31012    12/1998

* cited by examiner

Primary Examiner—Stephen Kalafut
Assistant Examiner—Julian Mercado
(74) Attorney, Agent, or Firm—Crowell & Moring LLP

(57) ABSTRACT

A multifuel fuel cell system includes a hydrogen production unit; at least one fuel cell; means for heating a first catalytic converter element in the hydrogen production unit to an operating temperature which can be preset; means for metering liquid fuel, air, and optionally water to the catalytic converter element to produce a synthetic gas mixture containing hydrogen or a reformate; and means for passing the synthetic gas or reformate to further components of the hydrogen production unit which are connected between the catalytic converter element and the at least one fuel cell. The fuel cell system also contains means for switching the fuel cell system between a first and a second operating mode. Separation occurs between the hydrogen production unit and the at least one fuel cell during the first operating mode, and a communicating connection occurs between the hydrogen production unit and the at least one fuel cell during the second operating mode, so that reformate can be transferred from the hydrogen production unit to the at least one fuel cell only during the second operating mode.

11 Claims, 1 Drawing Sheet

US 6,713,202 B2

MULTIFUEL FUEL CELL SYSTEM AND A METHOD FOR ITS OPERATION

BACKGROUND AND SUMMARY OF INVENTION

This application claims the priority of German application No. 100 100 68.6-45, filed Mar. 2, 2000, the disclosure of which is expressly incorporated by reference herein.

The present invention relates to a multifuel fuel cell system and to a method for its operation.

Owing to their method of operation, fuel cells have better energy efficiency than conventional internal combustion engines, for which reason they are increasingly being used for electricity generation in both stationary and mobile applications.

Since fuel cells are normally operated with hydrogen, which can be stored only with great complexity, attempts are increasingly being made to store the hydrogen in the form of liquid fuels. Such fuels are either pure hydrocarbons or alcohols. The prior art for mobile applications, in particular in the motor vehicle field, at the moment predominantly uses methanol, which is split in a gas production unit or hydrogen reformation system into hydrogen and carbon dioxide. In practice, a complete fuel cell system comprises at least one fuel cell with coolant connection, an air supply, and a gas production unit.

Typical gas production units have a fuel tank, in particular a methanol tank; a water tank; metering pumps for methanol and water; an evaporator and a superheater for methanol and water; a reformer unit; means for carbon monoxide removal by selective oxidation, methanization or application to a membrane (membrane unit); and a burner unit for producing heat for the vaporization and reformation.

For mobile applications, the lack of a methanol infrastructure and the low storage density of methanol in comparison to fuels based on mineral oils have been found to be major disadvantages. Furthermore, the high energy vehicle efficiency of a methanol fuel cell system is virtually balanced out by the upstream chain for methanol production. Hydrogen production based on conventional liquid fuels, for example diesel, petrol or LPG, is thus increasingly being considered for mobile fuel applications. These so-called multifuel fuel cell systems normally have at least one fuel tank; a water tank; metering systems for the respective fuel or a number of different fuels and water; an evaporator and superheater for the fuel or fuels and water; a high-temperature reformer for carrying out partial oxidation (POX reformer) with shift units; means for carbon monoxide removal by selective oxidation, methanization or application to a membrane; and a burner unit for producing heat for the vaporization and reformation.

The chemical process for obtaining hydrogen from hydrocarbons is generally partial oxidation reformation in accordance with the following equation:

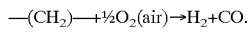
—(CH$_2$)—+½O$_2$(air)→H$_2$+CO.

Another method comprises vapour reformation of hydrocarbons based on the following equation:

—(CH$_2$)—+2H$_2$O→3H$_2$+CO$_2$.

Combinations of the two stated processes are likewise possible, and lead to autothermal methods of operation.

The energy required to obtain hydrogen (vaporization and subsequent reformation) in such multifuel gas production systems is produced in a catalytic burner and/or during the selective carbon monoxide oxidation and/or in the shift stages.

A method for operation of a steam reformation system is known from EP 0 924 161 A2. This document relates to a system and a method for operating the system for steam reformation of a hydrocarbon. The system includes a reactor which is suitable for both partial oxidation operation and reformation operation; an evaporator; and a hydrogen separation stage and a catalytic burner device. In the system described, a first part of the catalytic burner device is in thermal contact with the reformation reactor, and a second part of the catalytic burner device is in thermal contact with the evaporator. In addition, means are provided for switching the reactor between partial oxidation operation and reformation operation, and these means include an air/hydrocarbon intermediate feedline for the reactor and a pressure-maintaining valve. According to the method, when the system is started from cold, a heating process is carried out during which the reactor is initially operated at low temperature in the partial oxidation mode and is then switched to the reformation mode, with the pressure at the same time being increased to the normal operating pressure.

A method for operation of a system for steam reformation of a hydrocarbon is known from WO 99/31012. In this case, once the system has been warmed up, the original substance to be reformed is subjected to steam reformation in the reformation reactor. When the system is started from cold, at least a part of the reformation reactor, as a multifunctional reactor unit, is operated as a catalytic burner unit in a first operating phase, with a fuel and a gas containing oxygen being supplied, and is operated as a partial oxidation unit, for partial oxidation of the original substance, in a subsequent, second operating phase. The method is distinguished by the fact that, shortly before the change from the first operating phase to the second, water is metered into the supplied mixture of fuel and gas containing oxygen. During the first operating phase, the fuel flow rate is increased as the temperature of the multifunctional reactor unit rises, and the flow rate of the gas containing oxygen is actually set to be sub-stoichiometric during the first operating phase.

The object of the present invention is to provide a multifuel fuel cell system which can be operated in a simple manner, and a method for its operation, by which the cold-starting behavior of a vehicle powered by fuel cells also achieves the desired characteristics.

According to the present invention, a starting behavior which has a minimal warming-up time for the system components can now be achieved for vehicles powered by fuel cells. In addition, it is possible substantially to prevent any undesirable cold-starting emissions, since the catalytic converter elements produce their full performance even shortly after starting.

It is preferable for the components which are provided between a first catalytic converter element and at least one fuel cell to comprise a high-temperature heat exchanger, at least one shift stage, a selective oxidizer, a catalytic burner, a high-pressure compressor and/or an evaporator. Expedient interconnection of these components makes it possible to produce a hydrogen gas of a desired purity. Furthermore, the physical separation according to the present invention between these components and the fuel cell during the first operating mode makes it possible to achieve advantageous cold-starting behavior.

The separation of and the connection between the hydrogen production unit and the at least one fuel cell are expediently provided by mechanical separating means, in particular a three-way cock. By opening and closing a three-way cock, it is possible to switch between a first operating mode and a second operating mode in a simple manner.

The at least one shift stage, the selective oxidizer and/or the catalytic burner in each case has air metered to them in an advantageous manner, in particular during the first operating mode. This makes it possible for the air to be catalytically converted with the synthetic gas or reformate with a large amount of heat being developed, by which these components are actively heated. For example, a downstream evaporator can then be heated by the hot exhaust gas from the catalytic burner.

Other objects, advantages and novel features of the present invention will become apparent from the following detailed description of the invention when considered in conjunction with the accompanying drawings.

BRIEF DESCRIPTION OF THE DRAWING

The sole FIGURE shows a schematic and simplified block diagram of a fuel cell system according to the present invention.

DETAILED DESCRIPTION OF THE DRAWING

Figure 1:
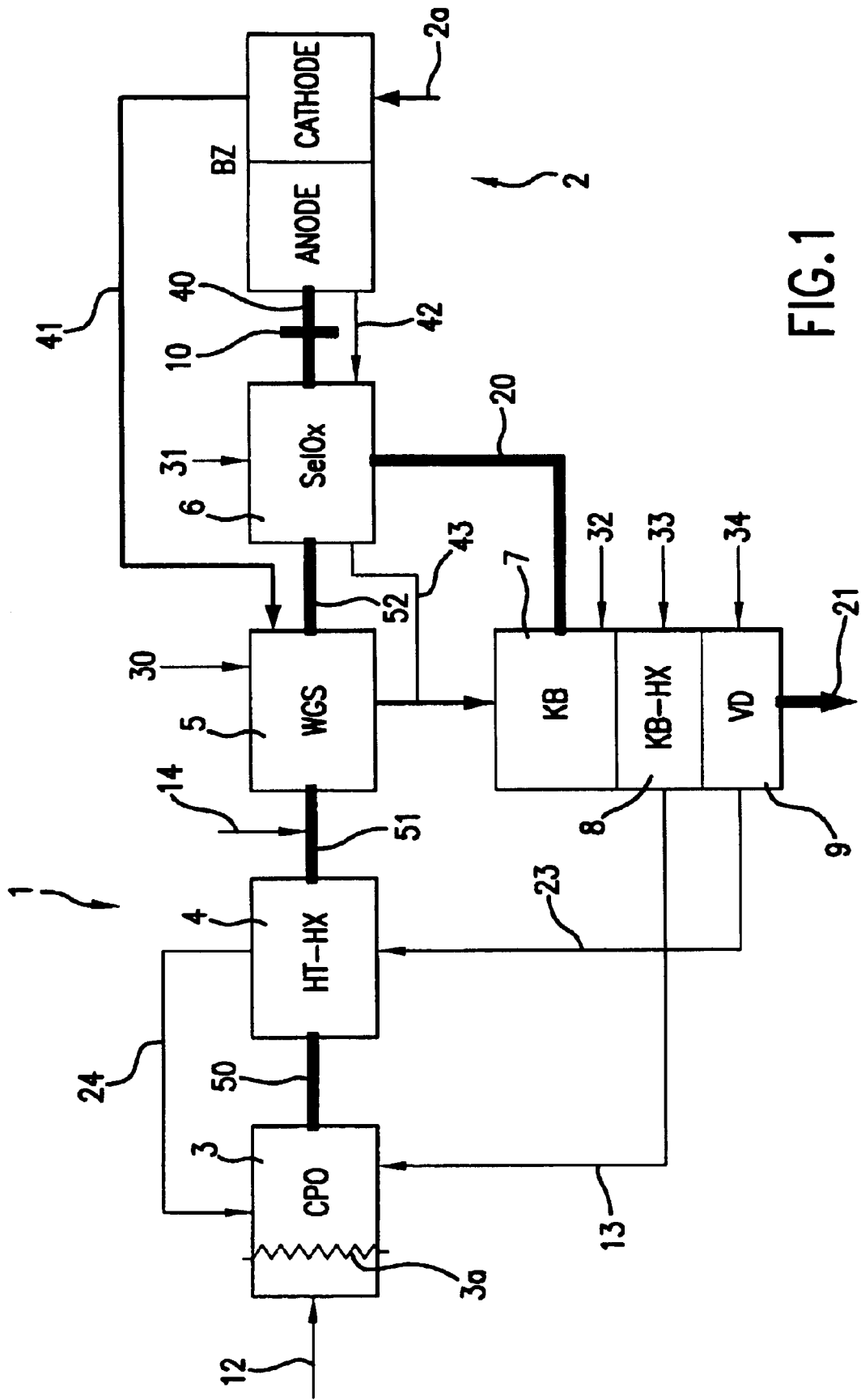

The illustrated multifuel fuel cell system has, as essential parts, a hydrogen production unit, which is referred to overall as 1, and at least one fuel cell, which is referred to as 2. The fuel cell 2 in this case has a coolant connection (not illustrated) and an air supply referred to as 2a. The hydrogen production unit comprises a fuel tank (not illustrated); a water tank (not illustrated); metering systems (not illustrated) for at least one of fuel and water; a catalytic converter element 3 (referred to in the following text as a partial oxidation catalytic converter); a high-temperature heat exchanger 4; at least one shift stage 5; a selective oxidizer 6; a catalytic burner 7; a high-pressure compressor 8; and an evaporator 9. The partial oxidation catalytic converter 3 is equipped with electrical heating means 3a, by which it can be preheated to a required ignition temperature, as will be explained further below. The catalytic burner and the high-pressure compressor can have air applied to them (arrows 32 and 33). Fuel and, if required, water can be supplied (arrow 34) to the evaporator 9. A schematically-illustrated three-way cock 10 is provided in a pipe 40 between the hydrogen production unit 1 and the at least one fuel cell 2, by which the pipe system of the hydrogen production unit can be connected to and disconnected from the fuel cell 2. It should be noted that the pipe 20, described further below, can expediently be connected directly to the three-way cock.

This three-way cock 10 allows the illustrated fuel cell system to be operated in two different operating modes. In a first operating mode, with the path between the selective oxidizer 6 and the fuel cell 2 closed, the hydrogen production unit 1 and the at least one fuel cell 2 are physically disconnected from one another, that is to say hydrogen gas produced in the hydrogen production unit cannot be passed to the fuel cell 2. In fact, in this first operating mode, the pipe 20 is used to produce a bypass pipe for the fuel cell, and to produce a material flow exclusively between the components of the hydrogen production unit 1.

The first operating mode will now be explained in detail:

The partial oxidation catalytic converter 3 is preheated to a required ignition temperature by electrical heating means 3a. Any suitable liquid fuel (pipe 12) and air from the high-pressure compressor 8 (pipe 13) are then supplied, in a metered manner, to the partial oxidation catalytic converter. The partial oxidation catalytic converter 3 starts (the required operating temperatures are 700° C. to 1000° C.) and essentially immediately supplies a synthetic gas mixture. The chemical process for hydrogen production from hydrocarbon which takes place in this case is partial oxidation reformation, which is known per se, in accordance with the following equation:

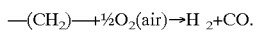

This hot synthetic gas is then passed via a pipe 50 to the high-temperature heat exchanger 4, and is then supplied via a pipe 51 to the at least one shift stage 5. Before entering the shift stage, the cooled synthetic gas has shift water applied to it via a pipe 14. The reaction which takes place in the shift stage is used to produce further hydrogen, essentially in accordance with the equation $CO+H_2O \rightarrow H_2+CO_2$. The hydrogen-rich reformate produced in the at least one shift stage 5 is then supplied via a pipe 52 to the selective oxidizer 6 in which the typically one percent carbon monoxide residue remaining is converted into carbon dioxide in accordance with the equation $CO+\frac{1}{2}O_2(air) \rightarrow CO_2$. Since the three-way cock 10 is closed in the first operating mode, the hydrogen-rich gas emerging from the selective oxidizer 6 is passed via the pipe 20 to the catalytic burner 7.

As can be seen from the figure, air can now be added in a metered manner (via pipes 30, 31 and 32) in each case to the reformate, which contains hydrogen, in the at least one shift stage 5, in the selective oxidizer 6, and in the catalytic burner 7. If required, suitable fan devices may be used in this process. This air reacts catalytically with the reformate, with a large amount of heat being produced and, in consequence, actively heats these components of the heat production unit 1. The hot exhaust gas from the catalytic burner 7 can be used, for example, to heat the evaporator 9. The exhaust gas from the catalytic burner 7, which emits virtually all its heat in this way, can be emitted via an exhaust pipe 21 (tailpipe) to the environment.

The combination of the hot reformate flow generated in the partial oxidation catalytic converter 3, and the catalytic combustion of this reformate flow in the components 5, 6 and 7, makes it possible, once ignition has taken place in the partial oxidation catalytic converter 3, for the entire hydrogen production system 1 to be raised virtually simultaneously, and in a controlled manner and very quickly, to the required operating temperatures. In addition, no undesirable cold-starting emissions are produced, since the partial oxidation catalytic converter produces virtually 100 percent conversion once it has been started. Any residual hydrocarbons can be converted, if required, in the catalytic burner 7.

After reaching the required operating temperatures and the required operating conditions for the hydrogen production system 1, the path through the three-way cock 10 between the selective oxidizer 6 and the fuel cell can easily be opened, thus applying reformate and/or very pure hydrogen gas to the at least one fuel cell. In this case, it has been found to be expedient to supply a cathode exhaust gas via a pipe 41 to the at least one shift stage 5, and an anode exhaust gas via a pipe 42 to the selective oxidizer 6, as cooling gases. The preheated fuel cell exhaust gases are combined in a pipe 43, and are then converted in the catalytic burner 7. This second operating mode essentially represents a normal operating mode of the fuel cell system. It should be noted that, in the second operating mode, water vaporized in the evaporator 9 and/or vaporized fuel are/is applied (via a pipe 23) to the high-temperature heat exchanger 4. During the second operating mode, vapour and/or vaporized fuel can expediently be passed back (pipe 24) from the high-temperature heat exchanger 4 to the partial oxidation catalytic converter 3, so that, in addition to partial oxidation, steam reformation also takes place there.

Finally, it should be noted that the term "pipe" which is used is intended to cover any desired connecting or communication means.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A multifuel fuel cell system, comprising:
    a hydrogen production unit;
    at least one fuel cell;
    means for heating a catalytic converter element in the hydrogen production unit to an operating temperature which can be preset;
    means for metering liquid fuel and air to the catalytic converter element to produce a synthetic gas mixture containing hydrogen;
    means for passing the synthetic gas mixture to at least one additional component connected between the catalytic converter element and the at least one fuel cell to provide a reformate; and
    means for switching the fuel cell system between a first operating mode, where the hydrogen production unit is raised to a predetermined operating temperature, and a second operating mode, wherein the hydrogen production unit and the at least one fuel cell are disconnected during the first operating mode and are connected during the second operating mode and wherein the means for switching is disposed between the catalytic converter element and the at least one fuel cell and switches the fuel cell system from the first operating mode to the second operating mode upon the hydrogen production unit reaching the predetermined operating temperature,
    and further wherein reformat can be transferred from the hydrogen production unit to the at least one fuel cell only during the second operating mode.

2. A fuel cell according to claim 1, wherein said catalytic converter element comprises a partial oxidation catalytic converter.

3. A fuel cell system according to claim 1, wherein the at least one additional component comprises at least one of a high-temperature heat exchanger; at least one shift stage; a selective oxidizer; a catalytic burner; a high-pressure compressor; or an evaporator.

4. A fuel cell system according to claim 1, wherein the means for switching comprise mechanical separating means.

5. A fuel cell system according to claim 4, wherein said mechanical separating means comprises a three-way cock.

6. A fuel cell system according to claim 3, further comprising means for metering air to at least one of the at least one shift stage, the selective oxidizer, or to the catalytic burner.

7. A multifuel fuel cell system, comprising:
    a hydrogen production unit;
    at least one fuel cell;
    a catalytic converter element in the hydrogen production unit;
    a heater for the catalytic converter element;
    a liquid fuel pipe leading from a fuel tank to the catalytic converter element and an air pipe leading from a compressor to the catalytic converter element;
    a pipe leading from the catalytic converter element to at least one of a high-temperature heat exchanger; at least one shift stage; a selective oxidizer; a catalytic burner; a high-pressure compressor; or an evaporator for passing a synthetic gas mixture; and
    a switch between the catalytic converter element and the fuel cell that switches the fuel cell system between a first operating mode, where the hydrogen production unit is raised to a predetermined operating temperature, and a second operating mode, wherein the hydrogen production unit and the at least one fuel cell are disconnected during the first operating mode and are connected during the second operating mode and wherein the switch switches the fuel cell system from the first operating mode to the second operating mode upon the hydrogen production unit reaching the predetermined operating temperature and further wherein reformate can be transferred from the hydrogen production unit to the at least one fuel cell only during the second operating mode.

8. A method for operating a multifuel fuel system having a hydrogen production unit and at least one fuel cell, comprising:
    heating a catalytic converter element in the hydrogen production unit to a required operating temperature;
    metering a liquid fuel and air to the catalytic converter element, thereby producing a synthetic gas mixture containing hydrogen;
    passing the synthetic gas mixture to additional components of the hydrogen production unit which are connected between the catalytic converter element and the at least one fuel cell;
    feeding a reformate to the at least one fuel cell by operating a switch disposed between the catalytic converter element and the at least one fuel cell only when at least one of the catalytic converter element or at least one of the additional components has reached a predetermined operating temperature.

9. A method according to claim 8, wherein said catalytic converter element comprises a partial oxidation catalytic converter.

10. A method according to claim 8, wherein the step of operating a switch comprises opening mechanical separating means.

11. A method according to claim 8, further comprising metering air to at least one of a selective oxidizer or to a catalytic burner.

* * * * *